US011380959B2

(12) United States Patent
Beck et al.

(10) Patent No.: US 11,380,959 B2
(45) Date of Patent: Jul. 5, 2022

(54) HOUSING ASSEMBLY FOR A HIGH-VOLTAGE ENERGY ACCUMULATOR AND VEHICLE

(71) Applicant: AUDI AG, Ingolstadt (DE)

(72) Inventors: Wolfgang Beck, Aichach (DE); Eduard Main, Hepberg (DE)

(73) Assignee: AUDI AG, Ingolstadt (DE)

( * ) Notice: Subject to any disclaimer, the term of this patent is extended or adjusted under 35 U.S.C. 154(b) by 309 days.

(21) Appl. No.: 16/875,402

(22) Filed: May 15, 2020

(65) Prior Publication Data

US 2020/0365852 A1 Nov. 19, 2020

(30) Foreign Application Priority Data

May 15, 2019 (DE) .......................... 102019207086.8

(51) Int. Cl.
*H01M 50/20* (2021.01)
*B60K 1/04* (2019.01)
*B60R 16/03* (2006.01)
*H01M 50/24* (2021.01)

(52) U.S. Cl.
CPC ............... *H01M 50/20* (2021.01); *B60K 1/04* (2013.01); *B60R 16/03* (2013.01); *H01M 50/24* (2021.01); *H01M 2220/20* (2013.01)

(58) Field of Classification Search
CPC .. H01M 50/20; H01M 50/24; H01M 2220/20; B60K 1/04; B60R 16/03
See application file for complete search history.

(56) References Cited

FOREIGN PATENT DOCUMENTS

| DE | 102010013025 A1 | 9/2011 | |
|---|---|---|---|
| DE | 102010055598 A1 | 6/2012 | |
| DE | 102011015152 A1 | 9/2012 | |
| DE | 102011083663 A1 | 4/2013 | |
| DE | 102013017339 A1 | 4/2015 | |
| DE | 102017205439 A1 | 7/2017 | |
| DE | 102016222823 A1 * | 5/2018 | ............. H05K 7/142 |

OTHER PUBLICATIONS

German Examination Report dated Mar. 10, 2020 in corresponding German Application No. 10 2019 107 086.8; 24 pages.

* cited by examiner

*Primary Examiner* — Robert L Deberadinis
(74) *Attorney, Agent, or Firm* — Maier & Maier, PLLC

(57) ABSTRACT

A housing assembly for a high-voltage energy accumulator of a motor vehicle, wherein the housing assembly comprises a housing for accommodating multiple accumulator modules, which housing comprises an outer side, which, in a state in which the multiple accumulator modules are accommodated in the housing, faces away from the multiple accumulator modules. In this case, the housing assembly includes an electrically insulating insulation element, which is arranged in at least one defined region of the outer side of the housing which, when the housing is located in its intended installation location in the motor vehicle, faces toward at least one vehicle electrical system component of a vehicle electrical system (comprised by the motor vehicle having a reduced voltage level in relation to the high-voltage energy accumulator.

20 Claims, 1 Drawing Sheet

HOUSING ASSEMBLY FOR A HIGH-VOLTAGE ENERGY ACCUMULATOR AND VEHICLE

FIELD

The disclosure relates to a housing assembly for a high-voltage energy accumulator of a motor vehicle, wherein the housing assembly includes a housing for accommodating multiple accumulator modules, which housing includes an outer side which, in a state in which the multiple accumulator modules are accommodated in the housing, faces away from the multiple accumulator modules. The disclosure also includes a motor vehicle having such a housing assembly.

BACKGROUND

A high-voltage energy accumulator, for example, a high-voltage battery, typically comprises multiple battery modules, which in turn comprise multiple individual battery cells. The individual battery modules or the accumulator modules in general, respectively, are then typically arranged in a housing, which can be directly or indirectly coupled to the vehicle body of the motor vehicle and/or arranged thereon. Furthermore, such a high-voltage battery can also comprise still further components, for example, a cooling unit for cooling the individual battery cells.

In this context, DE 10 2011 015 152 A1 describes an energy accumulator device having a plurality of accumulator cells and a temperature control unit for the temperature control of the accumulator cells. Since the cell housing walls of the cells are frequently embodied to be metallic and an electrical voltage is applied thereto, to prevent short-circuits, a cooling plate is isolated from the cell housings by an electrical insulation, for example, a heat-conducting film or the like. In a similar manner, DE 10 2010 013 025 A1, which describes a battery having a cooling plate arranged in a battery housing, also discloses that if a voltage is applied to the cell housings of the individual battery cells, to prevent short-circuits, an electrically insulating heat-conducting film and/or potting compound can be arranged between the individual cells and the heat-conducting plate.

Furthermore, DE 10 2010 055 598 A1 describes an individual cell for a battery having two housing parts, which are electrically isolated from one another by an insulating housing frame, which at least partially consists of a thermoplastic material. Furthermore, an electrode film stack arranged in the housing frame is located between the two housing parts.

The housing of the high-voltage energy accumulator itself is typically electrically insulated from the high-voltage potentials and is connected to ground. The battery housing can thus be safely touched from the outside without having to worry about an electric shock.

SUMMARY

However, since in particular voltages in the high-voltage range can be life-threatening, efforts are also still being made to make such a high-voltage energy accumulator as safe as possible.

The object of the present invention is therefore to provide a housing assembly for a high-voltage energy accumulator of a motor vehicle and a motor vehicle which permit the safest possible design of such a high-voltage energy accumulator.

The housing assembly according to the invention for a high-voltage energy accumulator of a motor vehicle comprises in this case a housing for accommodating multiple accumulator modules, which housing comprises an outer side which, in a state in which the multiple accumulator modules are accommodated in the housing, faces away from the multiple accumulator modules. In this case, the housing assembly comprises an electrically insulating insulation element, which is arranged in at least one defined region of the outer side of the housing which, when the housing is located in its intended installation location in the motor vehicle, faces toward at least one vehicle electrical system component of a vehicle electrical system comprised by the motor vehicle having a reduced voltage level in relation to the high-voltage energy accumulator.

The invention is based here on the finding that in case of fault, for example, in case of incorrect installation or removal or during maintenance work, it is possible that voltage influences, for example, short-circuits, can occur between the high-voltage energy accumulator system, i.e., the high-voltage energy accumulator, and the low-voltage vehicle electrical system or medium-voltage vehicle electrical system, and can result in various fault patterns and/or cases of damage to the components of the systems. This risk is particularly high if, for example, a fault already exists, according to which the housing of the high-voltage energy accumulator is in contact with a high-voltage potential or the housing of the high-voltage energy accumulator is contacted with a potential of the low-voltage or medium-voltage vehicle electrical system. If then, for example, during maintenance work on the low-voltage or medium-voltage vehicle electrical system, the other of the two low-voltage or medium-voltage potentials, respectively, is inadvertently also coupled, for example, via a metallic tool, with the housing of the high-voltage energy accumulator, this thus results in a current flow, in particular a short-circuit, which can result in severe damage. Although typically further safety concepts are also provided in a motor vehicle, for example, an insulation monitor which typically monitors the insulation between vehicle electrical system potentials and housings, in particular such double insulation faults may sometimes only be recognized with great difficulty or also too late, so that damage can then already have occurred. An electrically insulating insulation element is now also advantageously provided by the invention on the outer side of the housing for the high-voltage energy accumulator, which insulation element is arranged so that it faces toward at least one vehicle electrical system component of the vehicle electrical system having reduced voltage level in relation to the high-voltage energy accumulator, for example, a 12 V vehicle electrical system component or also a 48 V vehicle electrical system component. During maintenance work or in cases of fault, in particular during the installation or removal, any contact between this at least one vehicle electrical system component and the housing of the high-voltage energy accumulator, which is typically formed from metal, is advantageously prevented by such an insulation element. The risk of short-circuit between the high-voltage accumulator system, i.e., the high-voltage energy accumulator, and, for example, the low-voltage vehicle electrical system can thus advantageously be eliminated or at least reduced. Such an insulation system, as described in greater detail hereafter, can moreover be embodied particularly simply and cost-effectively, so that finally the safety in conjunction with high-voltage energy accumulators can be enhanced in a particularly simple, cost-effective, and efficient manner.

The high-voltage energy accumulator can represent, for example, a high-voltage battery defined at the outset, which comprises, for example, multiple accumulator modules formed as battery modules. One respective such battery module can in turn comprise multiple individual battery cells, which are combined to form a cell pack. In addition to the high-voltage vehicle electrical system, the motor vehicle can moreover comprise, as an example of a vehicle electrical system having voltage level reduced in relation to the high-voltage energy accumulator, as already mentioned, a low-voltage vehicle electrical system, for example, a 12 V vehicle electrical system, and/or a medium-voltage vehicle electrical system, for example, a 48 V vehicle electrical system. A vehicle electrical system component comprised by such a vehicle electrical system is then accordingly supplied with energy of the same voltage level, i.e., for example, with 12 V or with 48 V. Such vehicle electrical system components can then represent, for example, further energy accumulators, for example, a 12 V battery and/or a 48 V battery, various consumers, cables, lines, or other current-conducting and/or voltage-conducting components, which are connected to at least one of the potentials provided by such a low-voltage or medium-voltage vehicle electrical system.

The voltage level of the high-voltage energy accumulator in this case is preferably greater than 100 V, for example, 400 V or 800 V.

In one advantageous design of the invention, the insulation element is formed as a film and/or as a felt material and/or as a hook-and-loop closure. In this way, the insulation element is adaptable particularly easily and flexibly to the geometry of the housing or to the geometry of the region of the outer side of the housing, since in all of these cases, the insulation element can be provided as a bendable or flexible, nonrigid component. The insulation element may thus be attached particularly easily and cost-effectively to any arbitrary point of the housing.

For example, the insulation element can comprise a self-adhesive film, in particular a plastic film, and can thus be provided in the form of a type of sticker, which can simply be stuck onto the outer side at the desired position. In addition, such a film can be embodied to be opaque or also transparent or semitransparent. In the case of a transparent film, contents over which it is stuck, for example, inscriptions, instructions, pictograms, other stickers, or the like provided on the outer side of the housing, advantageously also still remain visible. However, such a film can also itself function as such a carrier of instruction texts or the like. The insulation element can thus furthermore, whether transparent or opaque, be embodied so that both the task of a sticker for contents, for example, inscriptions, instructions, pictograms, and also the insulation, in particular electrical insulation, are taken over by this film. To function as a carrier for such contents, the film can be inscribed, printed, or otherwise provided with symbols or script suitably on one side or also both sides.

Furthermore, the insulation element, in particular if it is designed as a film, can be formed having different layer thicknesses, depending on the requirement, for example, for the geometry of the housing, to the required dielectric strength, to the required transparency, and so on, in particular having a thickness between 50 μm and 1 mm, for example, 100 μm, 200 μm, 300 μm, or similar thicknesses. This film can also be formed from different materials and/or different materials come into consideration for the formation and provision of the film, for example, PU (polyurethane), PE (polyethylene), PET (polyethylene terephthalate), PVC (polyvinyl chloride). The film can also be provided simultaneously from various such plastics, for example, as a multilayer film. In addition, the film may also have any geometry, in particular two-dimensional or also three-dimensional and, with suitably selected length and/or having width, depending on the intended mounting location on the outside of the housing. A particularly high level of flexibility and adaptation options may thus be provided by the formation of the insulation element as a film.

This also applies similarly for the formation of the insulation element as a felt. In this case, the insulation element can also be formed, for example, as a self-adhesive felt, which enables particularly easy attachment to the outer side of the housing. The insulation element can also again be provided here depending on the requirement, for example, for the geometry of the housing or other factors, such as the required dielectric strength and so on, having a correspondingly adapted layer thickness, in particular different layer thicknesses, can be formed from different material and/or provide different geometries, for example, can in turn be formed two-dimensionally and/or three-dimensionally and/or having different length and/or width. In particular, the insulation element can also again here have a thickness in the above-mentioned range and can be formed from above-mentioned plastics or also other materials. This also applies accordingly if the insulation element is formed as a hook-and-loop closure. If the insulation element is formed as a hook-and-loop closure, the insulation element, in addition to its task of electrical insulation as such, can also additionally assume the task of providing a cable holder or line holder or the like in a particularly simple manner.

In a further advantageous design of the invention, the insulation element is formed as a dimensionally-stable plastic component, in particular as a foamed plastic component and/or as an injection molded plastic component and/or as an additively manufactured plastic component. If the insulation element is formed as a dimensionally-stable plastic part, it thus preferably already substantially has the geometry of this region of the outer side even before the arrangement on the corresponding region of the outer side of the housing. Significantly thicker layer thicknesses, in particular in the millimeter range, for example, 1 mm, 1.5 mm, 2 mm, and so on, preferably in the range between 1 mm and 5 mm, may be provided by such a formation of the insulation element as a dimensionally-stable plastic component. A higher dielectric strength can thus be provided. Various materials, which are combinable with one another, also again come into consideration here for the formation of the insulation element, in particular the above-mentioned plastics, for example, PVC, in particular E-PVC, i.e., polyvinyl chloride which was produced by emulsion polymerization.

The option also again exists in this case of forming the insulation element transparent, semitransparent, or opaque as needed, depending on the requirement. Moreover, in a dimensionally-stable formation of the insulation element, a further function as a cable holder or line holder may be provided thereby.

However, not only the above-mentioned materials come into consideration for the formation of the insulation element, the insulation element can also be formed from paper and/or elastomer and/or leather and/or bitumen and so on and/or in general from other electrically insulating materials. Even with such materials the option exists of adapting the insulation element flexibly to the respective requirements, in particular again with respect to thickness, geometry, transparency, and so on.

The housing assembly can also comprise differently formed insulation elements, which can be arranged, for example, at different positions and/or in different regions of the outer side of the housing.

As already mentioned, one or more further functions can also be provided by the insulation element if needed. Therefore, it represents a further advantageous design of the invention if the insulation element is additionally designed to provide at least one function different from electrical insulation. By providing a double or multiple function, the efficiency of the insulation element can advantageously be increased further.

It is particularly advantageous here if the at least one function represents at least one of the following: A provision of a holder for a cable and/or a line, a provision of a spacer to keep the housing at a defined distance from a motor vehicle component, a heat shield, a carrier function for carrying instruction texts and/or symbols, and a scuff protection.

Especially the provision of a cable holder or a holder for a line is particularly advantageous, since various lines and/or cables typically extend in particular in the region of the high-voltage energy accumulator in a motor vehicle, which can be guided in this manner and/or can also be fastened, without an additional component or a separately manufactured holder or the like being required for this purpose. Such a holder may be provided in a particularly simple manner if the insulation element is manufactured from a dimensionally-stable plastic, as already described, or is also embodied, for example, as a hook-and-loop closure, so that a loop for guiding such a cable or a line can be provided easily by such a hook-and-loop closure.

The insulation element, depending on the position of its arrangement, can also function, for example, as a defined spacer to keep the housing at a defined distance from a motor vehicle component or also from multiple motor vehicle components, for example, at a defined distance from the cargo floor in the luggage compartment region of the motor vehicle, so that separate components, in particular separately provided spacers, can also again be saved here. Moreover, the insulation element may also be used as a heat shield, depending on design. Especially plastics generally offer a good thermal insulation capability, in particular in comparison to metals, so that, for example, cooling power for cooling the high-voltage energy accumulator can also be saved simultaneously by the provision of the insulation element, if this high-voltage energy accumulator can now advantageously be thermally insulated well from the surroundings via the provided insulation element.

Moreover, as also described at the outset, the insulation element can also function simultaneously as a carrier of instruction texts, symbols, pictograms, or the like upon suitable inscription or printing or the like. Additional stickers or further components may in turn also be provided in this way. A scuff protection can simultaneously also be provided by the insulation element. This is possible in a particularly effective manner in particular if the insulation element is formed, for example, as a felt material and/or hook-and-loop closure or leather or the like. This advantageously permits a direct arrangement of the housing assembly, in particular of the insulation element, on other vehicle components, without having to worry about a mechanical negative affect, destruction, or scratching. Installation space may thus in turn be saved, since significantly more compact arrangement options of the motor vehicle components are provided in this way.

In a further advantageous design of the invention, the housing comprises a cover which, when the housing is located in its intended installation location in the motor vehicle, provides an upper side of the housing, wherein the defined region of the outer side in which the insulation element is arranged is provided by the cover. In other words, the insulation element is arranged on the cover of the housing. A particularly efficient installation of vehicle electrical system components of the vehicle electrical system having voltage level reduced in relation the high-voltage accumulator may be provided in this way, since such other vehicle electrical system components are typically arranged above the high-voltage energy accumulator.

In principle, the insulation element can additionally or alternatively, however, also be provided at any arbitrary other point of the housing. Moreover, the insulation element can also cover and/or insulate both a portion, in particular only one portion, and also entire components or systems.

Accordingly, for example, it represents an advantageous design of the invention if only a part of the outer side of the housing comprises the insulation element or the insulation element is only arranged in a part of the outer side of the housing, so that a part of the outer side of the housing is not electrically insulated to the outside. This has the great advantage that the insulation element, possibly also multiple insulation elements separated from one another, can intentionally be positioned in those regions which face toward components, i.e., vehicle electrical system components of the vehicle electrical system having voltage level reduced in relation to the high-voltage energy accumulator. This permits a particularly efficient design, since the housing does not have to be provided comprehensively with such an insulation element, i.e., not necessarily in regions in which there is no risk of short-circuit in any case.

Nonetheless, it is also possible, as is provided according to a further design of the invention, that the insulation element is arranged substantially covering the entire outer side of the housing. This design permits a particularly high level of flexibility, since even if the arrangement of components inside a motor vehicle changes, for example, in the next generation of the motor vehicle, no change or adaptation with respect to the position of the insulation element in the housing of the high-voltage energy accumulator has to be performed, since the insulation element completely covers the housing in any case and electrically insulates it to the outside. Since the insulation element can be formed in a particularly simple and cost-effective manner in any case, as described above, the flexibility and the possible uses of the housing assembly may be increased in a particularly efficient and cost-effective manner by this design of the invention.

A high-voltage energy accumulator, for example, a high-voltage battery, having a housing assembly according to the invention or one of its designs, is also to be considered to be part of the invention. The high-voltage energy storage device can be designed as described in the introduction and comprise, for example, multiple battery modules each having multiple individual battery cells. These accumulator modules formed as battery modules can then be arranged accordingly in the described housing.

Furthermore, the invention also relates to a motor vehicle having a housing assembly according to the invention or one of its designs.

It is particularly advantageous in this case if the motor vehicle comprises at least one vehicle electrical system component, in particular a 12 V vehicle electrical system component and/or a 48 V vehicle electrical system component, of a vehicle electrical system having reduced voltage level in relation to the high-voltage energy accumulator, wherein the insulation element is arranged on the outer side of the housing in such a way that, for example, the insulation element is located between the at least one vehicle electrical system component and the housing.

As already described in conjunction with the housing assembly according to the invention and its designs, in this way the risk of a short circuit between the high-voltage accumulator system and the low-voltage vehicle electrical system may be eliminated or at least reduced. The advantages mentioned in conjunction with the housing assembly according to the invention and its designs also apply otherwise in the same manner to the motor vehicle according to the invention.

The motor vehicle according to the invention is preferably designed as an automobile, in particular as a passenger automobile or truck, or as a minibus or motorcycle. Furthermore, the motor vehicle can be provided as an electric vehicle and/or hybrid vehicle having electric drive.

The invention also comprises the combinations of the features of the described embodiments.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another. Therefore, the disclosure is also to comprise combinations of features of the embodiments other than those illustrated. Furthermore, the described embodiments can also be supplemented by further ones of the above-described features of the invention.

In the figures, identical reference signs each identify functionally-identical elements.

Figure 1:
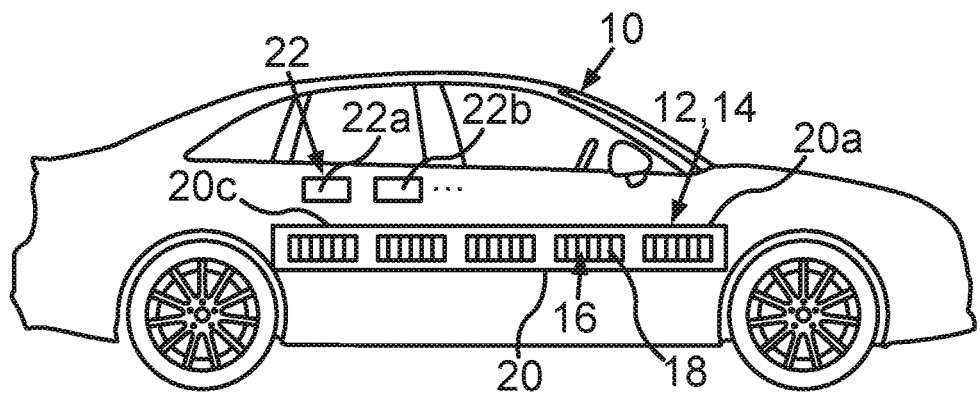
FIG. 1 shows a schematic illustration of a motor vehicle having a high-voltage energy accumulator and a housing assembly according to an exemplary embodiment of the invention.

FIG. 1 shows a schematic illustration of a motor vehicle 10 having a high-voltage energy accumulator 12, which comprises a housing assembly 14 according to one exemplary embodiment of the invention. The high-voltage energy accumulator 12 is formed in this case as a high-voltage battery 12 and comprises multiple accumulator modules formed as battery modules 16, of which only one is provided with a reference signs for reasons of clarity. A respective one of these accumulator modules 16 in turn comprises multiple individual battery cells 18, of which only one is again provided with a reference signs for reasons of clarity. These individual battery cells 18 can be formed, for example, as lithium-ion cells. Furthermore, the housing assembly 14 comprises a housing 20, in which the accumulator modules 16 are accommodated. This housing 20 in turn comprises an outer side 20a, which faces away from the accumulator modules 16. Moreover, the motor vehicle 10 also comprises a low-voltage vehicle electrical system 22, for example, a 12 V vehicle electrical system or a 48 V vehicle electrical system. This low-voltage vehicle electrical system 22 in turn comprises multiple vehicle electrical system components 22a, 22b, for example, a 12 V battery and/or a 48 V battery and/or various consumers, cables, and so on. These vehicle electrical system components 22a, 22b are arranged in this example above the high-voltage energy accumulator 12.

In conventional motor vehicles having high-voltage energy accumulators, in case of fault, voltage influences, in particular short-circuits, can occur between such a high-voltage energy accumulator system and the low-voltage vehicle electrical system and can result in various fault patterns and/or cases of damage to the components of the systems. Such voltage influences can now advantageously be avoided in that an insulation element 24 (cf. FIG. 2 to FIG. 4) is attached and/or arranged either partially or completely externally on the housing 20 of the high-voltage energy accumulator 12. In particular, in this case this insulation element 24 is arranged in a region 20c of the outer side 20a of the housing 20, which faces toward at least one of the vehicle electrical system components 22a, 22b of the low-voltage vehicle electrical system 22. Even a contact of a part of such a vehicle electrical system component 22a, 22b, in particular a contact of a potential of this low-voltage vehicle electrical system 22, with the outer side 20a of the housing 20 in this region 20c, in which the insulation element 24 is arranged, thus advantageously cannot result in a short-circuit.

Many advantageous options are available for the formation of this insulation element 24, which are explained in greater detail hereafter.

Figure 2:
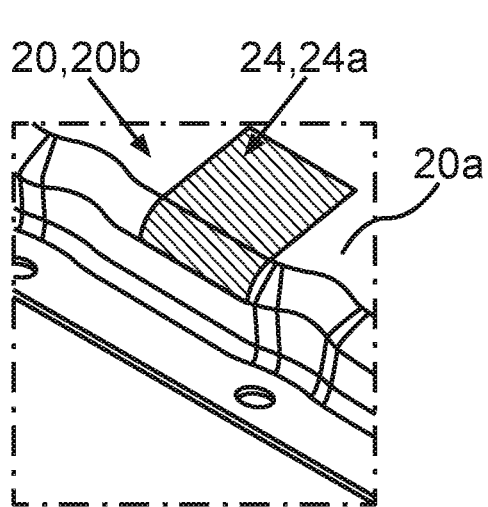
FIG. 2 shows a schematic illustration of a part of a housing cover of a housing assembly having an insulation element arranged on the outside and formed as a film according to one exemplary embodiment of the invention.

FIG. 2 shows in this case a schematic illustration of a part of a housing cover 20b of the housing 20 of the high-voltage energy accumulator 12 having an insulation element 24 formed as a self-adhesive film 24a according to one exemplary embodiment of the invention. The insulation element 24 is accordingly designed as a sticker 24a, which can be stuck or in this example is stuck in a simple manner onto the outer side 20a of the housing 20, in this example onto the housing cover 20b, which terminates the housing 20 on top, i.e., in the direction of the low-voltage vehicle electrical system 22. The formation as such a film 24a offers a particularly high level of flexibility, in particular with regard to the geometrical design, the transparency, the thickness, and the arrangement options thereof. Since such a film 24a, because of its thin embodiment, in particular in the three-digit micrometer range, is adaptable particularly easily to any arbitrary geometry, in particular 2D or also 3D and can be stuck on or attached in another manner to the housing cover 20b and/or in general to the outer side 20a of the housing 20, such a film 24a provides a particularly simple, cost-effective, and advantageous option for providing an insulation element 24. The insulation element 24, which is thus formed in this example as the film 24a, can thus be embodied to be opaque or also transparent. In the case of a transparent film 24a, contents over which it is stuck, for example, existing inscriptions, still remain visible. The insulation element can also be embodied such that it also assumes the task of a sticker for content, for example, inscriptions, instructions, pictograms, and so on, in particular in addition to its function as an electrically insulating insulation element 24. Such inscriptions can be provided by the film 24a both with an opaque and also with a transparent embodiment of the film 24a. In this case, not only can the cover 20b of the housing 20 be adhesively bonded to such a film 24a, but rather also the lower side of the housing 20, and also in general any arbitrary portion of the housing 20 or also the entire outer side 20a of the housing.

Figure 3:
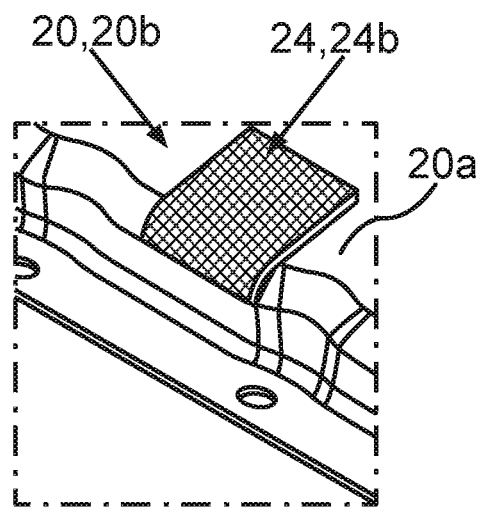
FIG. 3 shows a schematic illustration of a housing cover of a housing assembly having an insulation element arranged on the outside and formed as a felt according to a further exemplary embodiment of the invention.

FIG. 3 shows a schematic illustration of a part of a housing cover 20b of a housing 20 of a high-voltage energy accumulator 12 according to a further exemplary embodiment of the invention. In this example, an insulation element 24 is also again arranged on the outer side 20a of this housing cover 20b. In this example, the insulation element 24 is embodied as a felt 24b. Such a felt material 24b can also be correspondingly formed to be thin, for example, as described for the film 24a, or also somewhat thicker. The dielectric strength may thus also be increased by the thicker formation of such a felt material 24b. Nonetheless, such a felt material 24b still remains flexible, even with a somewhat thicker embodiment, for example, in the millimeter range, and may thus be adapted to any arbitrary geometry of the outer side 20a of the housing 20 and is thus flexibly usable just as described for the film 24a. In addition, such a felt material can also assume the function of a scuff protection and, depending on the material selection for the felt, can also provide a heat shield.

Alternatively or additionally, the insulation element 24 can also be formed as a hook-and-loop closure and then, for example, additionally assume the task of a cable holder. Such a hook-and-loop closure also provides a particularly flexible design option of the insulation element, which can thus adapt itself flexibly to arbitrary geometries of the outer side 20a of the housing 20 and can thus be arranged particularly flexibly at any arbitrary position of the outer side 20a of the housing 20.

Figure 4:
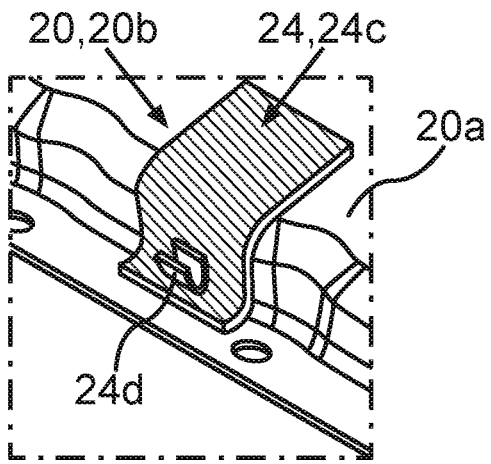
FIG. 4 shows a schematic illustration of a part of a housing cover of a housing assembly having an insulation element arranged on the outside and formed as a dimensionally-stable plastic component according to a further exemplary embodiment of the invention.

FIG. 4 shows a schematic illustration of a part of a housing cover 20b of the housing 20 having an insulation element 24 according to a further exemplary embodiment of the invention. In this example, the insulation element 24 is formed as a dimensionally-stable plastic part 24c. Such a plastic part 24c can be formed, for example, as a foamed plastic or injection molded plastic or a plastic manufactured using an additive. In this case, to provide the insulation element 24, in particular already before its arrangement on the housing 20, the geometry of this insulation element 24 is provided adapted in adaptation to the geometry of the outer side 20a of the region 20c, in which the insulation element 24 is to be arranged. Nonetheless, such dimensionally-stable plastic insulation elements 24c can be formed easily and cost-effectively and adaptable to any arbitrary geometry by injection molding methods or other simple production methods.

In particular, the insulation element 24 may thus moreover be provided in a particularly easy manner with a geometry which can be curved, for example, in two different spatial directions, for example, at rounded corners of the housing 20. In the case of a formation as a film or felt or the like, this is possible only by accepting a certain wrinkling or a multipart embodiment of the insulation element 24, which is nonetheless easy to provide.

A dimensionally-stable plastic part 24c is suitable as an insulation element 24 above all if even higher dielectric strengths are to be achieved, since layer thicknesses in the millimeter range and more may be provided by this plastic part 24c. The flexibility with respect to material selection, in particular selection of the plastic used for the plastic part 24c, and also with respect to the selection of the translucency or transparency is simultaneously also again provided here, very similarly as described for the film 24a. Additional functions can also again be provided here by the insulation element 24, for example, as a carrier for instruction texts, symbols, and so on. In the case of a transparent formation, instruction texts which are arranged directly on the outer side 20a of the housing 20 can also again still be seen through this insulation element 24. In this example, a holder 24d is moreover advantageously provided by the insulation element 24, by means of which, for example, a cable and/or a line can be held and/or clamped or guided. Additional holders for guiding or holding cables can thus be saved.

In general, the insulation element 24 can assume still further functions in addition to the electrical insulation task, for example, a holding function for cables, a scuff protection, the function of a spacer, a heatshield, and the function of an instruction text, symbol, or script carrier. In this manner, numerous additional components, such as holders for cables, spacers, protective elements, shield elements, stickers, and so on may be saved.

Overall, the examples show how an outside insulation element can be provided on a housing of a high-voltage accumulator system by the invention, which, by its arrangement between the housing and components of a low-voltage electrical system, can prevent voltage influences, in particular short-circuits, between the high-voltage accumulator system and the low-voltage vehicle electrical system in a particularly efficient and cost-effective manner.

The invention claimed is:

1. A housing assembly for a high-voltage energy accumulator of a motor vehicle wherein the housing assembly comprises:
   a housing for accommodating multiple accumulator modules, which housing comprises an outer side, which, in a state in which the multiple accumulator modules are accommodated in the housing, faces away from the multiple accumulator modules, wherein the housing assembly comprises an electrically insulating insulation element, which is arranged in at least one defined region of the outer side of the housing which, when the housing is located in its intended installation location in the motor vehicle, faces toward at least one vehicle electrical system component of a vehicle electrical system comprised by the motor vehicle having a reduced voltage level in relation to the high-voltage energy accumulator.

2. The housing assembly as claimed in claim 1, wherein the insulation element is formed as a film and/or as a felt material and/or as a hook-and-loop closure.

3. The housing assembly as claimed in claim 2, wherein the insulation element is formed as a dimensionally-stable plastic component, in particular as a foamed plastic component and/or as an injection molded plastic component and/or as an additively manufactured plastic component.

4. The housing assembly as claimed in claim 2, wherein the insulation element is additionally designed to provide at least one function different from electrical insulation.

5. The housing assembly as claimed in claim 2, wherein a part of the outer side of the housing comprises the insulation element.

6. The housing assembly as claimed in claim 2, wherein the insulation element is arranged substantially covering the entire outer side of the housing.

7. The housing assembly as claimed in claim 1, wherein the insulation element is formed as a dimensionally-stable plastic component, in particular as a foamed plastic component and/or as an injection molded plastic component and/or as an additively manufactured plastic component.

8. The housing assembly as claimed in claim 7, wherein the insulation element is additionally designed to provide at least one function different from electrical insulation.

9. The housing assembly as claimed in claim 7, wherein a part of the outer side of the housing comprises the insulation element.

10. The housing assembly as claimed in claim 7, wherein the insulation element is arranged substantially covering the entire outer side of the housing.

11. The housing assembly as claimed in claim 1, wherein the insulation element is additionally designed to provide at least one function different from electrical insulation.

12. The housing assembly as claimed in claim 11, wherein the at least one function represents at least one of the following:
- a provision of a holder for a cable and/or a line;
- a provision of a spacer to keep the housing at a defined distance from a vehicle component;
- a heat shield;
- a carrier function for carrying instruction text and/or symbols; and
- a scuff protection.

13. The housing assembly as claimed in claim 12, wherein a part of the outer side of the housing comprises the insulation element.

14. The housing assembly as claimed in claim 11, wherein a part of the outer side of the housing comprises the insulation element.

15. The housing assembly as claimed in claim 11, wherein the insulation element is arranged substantially covering the entire outer side of the housing.

16. The housing assembly as claimed in claim 1, wherein the housing comprises a cover, which, when the housing is located in its intended installation location in the motor vehicle provides an upper side of the housing, wherein the defined region of the outer side, in which the insulation element is arranged, is provided by the cover.

17. The housing assembly as claimed in claim 16, wherein a part of the outer side of the housing comprises the insulation element.

18. The housing assembly as claimed in claim 1, wherein a part of the outer side of the housing comprises the insulation element.

19. The housing assembly as claimed in claim 1, wherein the insulation element is arranged substantially covering the entire outer side of the housing.

20. A motor vehicle comprising:
- at least one vehicle electrical system component, in particular a 12 V vehicle electrical system component and/or a 48 V vehicle electrical system component, of a vehicle electrical system having reduced voltage level in relation to the high-voltage energy accumulator, wherein the insulation element is arranged on the outer side of the housing in such a way that the insulation element is located between the at least one vehicle electrical system component and the housing.

* * * * *